US012683350B2

(12) United States Patent
Guo et al.

(10) Patent No.: US 12,683,350 B2
(45) Date of Patent: Jul. 14, 2026

(54) ENERGETIC LASER DESIGN

(71) Applicant: L3Harris Technologies, Inc., Melbourne, FL (US)

(72) Inventors: Baoping Guo, Bluffton, SC (US); Edward Miesak, Windermere, FL (US)

(73) Assignee: L3Harris Technologies, Inc., Melbourne, FL (US)

( * ) Notice: Subject to any disclaimer, the term of this patent is extended or adjusted under 35 U.S.C. 154(b) by 804 days.

(21) Appl. No.: 17/546,776

(22) Filed: Dec. 9, 2021

(65) Prior Publication Data

US 2023/0187893 A1 Jun. 15, 2023

(51) Int. Cl.
H01S 3/08 (2023.01)
H01S 3/105 (2006.01)

(52) U.S. Cl.
CPC .......... H01S 3/08059 (2013.01); H01S 3/105 (2013.01)

(58) Field of Classification Search
CPC .... H01S 3/105; H01S 3/08059; H01S 3/1123; H01S 3/113; H01S 3/139; H01S 3/086
See application file for complete search history.

(56) References Cited

U.S. PATENT DOCUMENTS

| | | | |
|---|---|---|---|
| 5,663,792 A | 9/1997 | Killpatrick et al. | |
| 6,430,207 B1 | 8/2002 | Alphonse | |
| 6,829,276 B1 | 12/2004 | Alphonse | |
| 8,253,932 B1 | 8/2012 | Cole | |
| 2008/0225923 A1* | 9/2008 | Nettleton | H01S 3/113 |
| | | | 372/98 |

| | | | |
|---|---|---|---|
| 2012/0154903 A1* | 6/2012 | Miesak | G02F 1/39 |
| | | | 359/330 |
| 2014/0209794 A1* | 7/2014 | Woodruff | G01N 21/718 |
| | | | 250/226 |
| 2015/0194784 A1* | 7/2015 | Kwon | H01S 3/0401 |
| | | | 372/22 |
| 2016/0084757 A1* | 3/2016 | Miron | G01N 21/031 |
| | | | 356/437 |
| 2020/0200876 A1* | 6/2020 | Singh | H01S 3/10092 |

OTHER PUBLICATIONS

Cui-yun Wang, Da-liang Wang, Zi-nan Wang, Ping Lu, Lian-yu Xu, Xiao-qi Yu, Yun Jiang, Li-xin Zhu, Zheng-bin Li, "Experimental study on narrow linewidth fiber ring laser based on parallel feedback mechanism," Proc. SPIE 8192, International Symposium on Photoelectronic Detection and Imaging 2011: Laser Sensing and Imaging; and Biological and Medical Applications of Photonics Sensing and Imaging, 81922P (Aug. 19, 2011); https://doi.org/10.1117/12.900736.

* cited by examiner

*Primary Examiner* — Xinning(Tom) Niu
*Assistant Examiner* — Delma R Forde
(74) *Attorney, Agent, or Firm* — Condo Roccia Koptiw LLP

(57) ABSTRACT

An optical resonator may be provided. The optical resonator may comprise a laser system with an adjustable optical path length. The optical resonator may include a back mirror. The back mirror may include a first back mirror surface and a second back mirror surface. The first back mirror surface and may provide a first optical path length for the optical resonator if the first back mirror surface may be included in the optical path. The second back mirror may provide a second optical path length for the optical resonator if the second back mirror surface is included in the optical path.

15 Claims, 8 Drawing Sheets

Laser System 100

Configuration of Optical Resonator 408

Laser System 100

Mirror Thickness 406

HR surface 408

AR surface 404

Optical Path 424

112

114

116

Back Mirror 118

Q-Switch 110

Gain Medium 120

Output Coupler 122

Configuration of Optical Resonator 408

Laser System 100

Optical Path 624

Gain Medium 120

116

114

112

Q-Switch 110

Output Coupler 122

AR surface 404

Mirror Thickness 406

HR surface 408

Back Mirror 118

604

Corner Cube 602

Configuration of Optical Resonator 608

ENERGETIC LASER DESIGN

BACKGROUND

Lasers have many practical applications. For example, a laser may be used as part of a weapons guidance system, in which a pulsed laser beam is used to determine the distance to a target object. However, laser systems may be difficult to manufacture as laser performance may depend on the quality of the components that comprise the laser. For example, laser performance may be dependent on gain mediums, which may have varying levels of quality. And the varying quality of gain mediums may result in laser systems that are non-functional or fail to meet a performance requirement.

SUMMARY

A method, systems, and or apparatus may be provided to adjust an optical path length of an optical resonator and/or a laser. This may be done, for example, to allow the optical path length of an optical resonator to be adjusted to compensate for quality variations of a gain medium included in the optical resonator. In an example, a method may be provided to create an optical resonator and/or a laser system. In an example, a laser system may be provided. The laser system may comprise an optical resonator that may comprise an adjustable optical path.

An optical resonator may be provided. The optical resonator may comprise a laser system with an adjustable optical path length. The optical resonator may include an output coupler (OC). The output coupler may include a concave lens surface. The optical resonator may include a gain medium that may be a first distance from the output coupler along an optical path. The gain medium may include a glass doped with erbium. The optical resonator may include a back mirror. The back mirror may include a first back mirror surface and a second back mirror surface. The back mirror may be positioned a second distance from the gain medium along the optical path. The first back mirror surface may include a high reflective coating (e.g., surface). The first back mirror surface and may provide a first optical path length for the optical resonator if the first back mirror surface may be included in the optical path. The second back mirror surface may include a low reflective coating (e.g., surface). The second back mirror may provide a second optical path length for the optical resonator if the second back mirror surface is included in the optical path.

An optical resonator with an adjustable optical path length may be provided for a laser system. The optical resonator may include a gain medium. The gain medium may comprise a glass doped with erbium, which may be referred to as erbium glass. The optical resonator may comprise a corner cube that may be a first distance from the gain medium along an optical path. The optical resonator may include a back mirror that may include a first back mirror surface and a second back mirror surface. The back mirror may be positioned a second distance from the corner cube along the optical path. The first back mirror surface may include a high reflective coating. The first back mirror surface may provide a first optical path length for the optical resonator if the first back mirror surface is included in the optical path.

A laser system with an adjustable optical path length may be provided. The laser system may include a pump source to energize the gain medium so that the gain medium may produce a laser. The laser system may include a gain medium for providing an optical gain for the beam. The gain medium may include a glass doped with erbium. The laser system may include a back mirror. The back mirror may provide a first optical path length for the laser system if placed in a first position and may provide a second optical path length for the laser system if placed in a second position.

DETAILED DESCRIPTION

Figure 1:
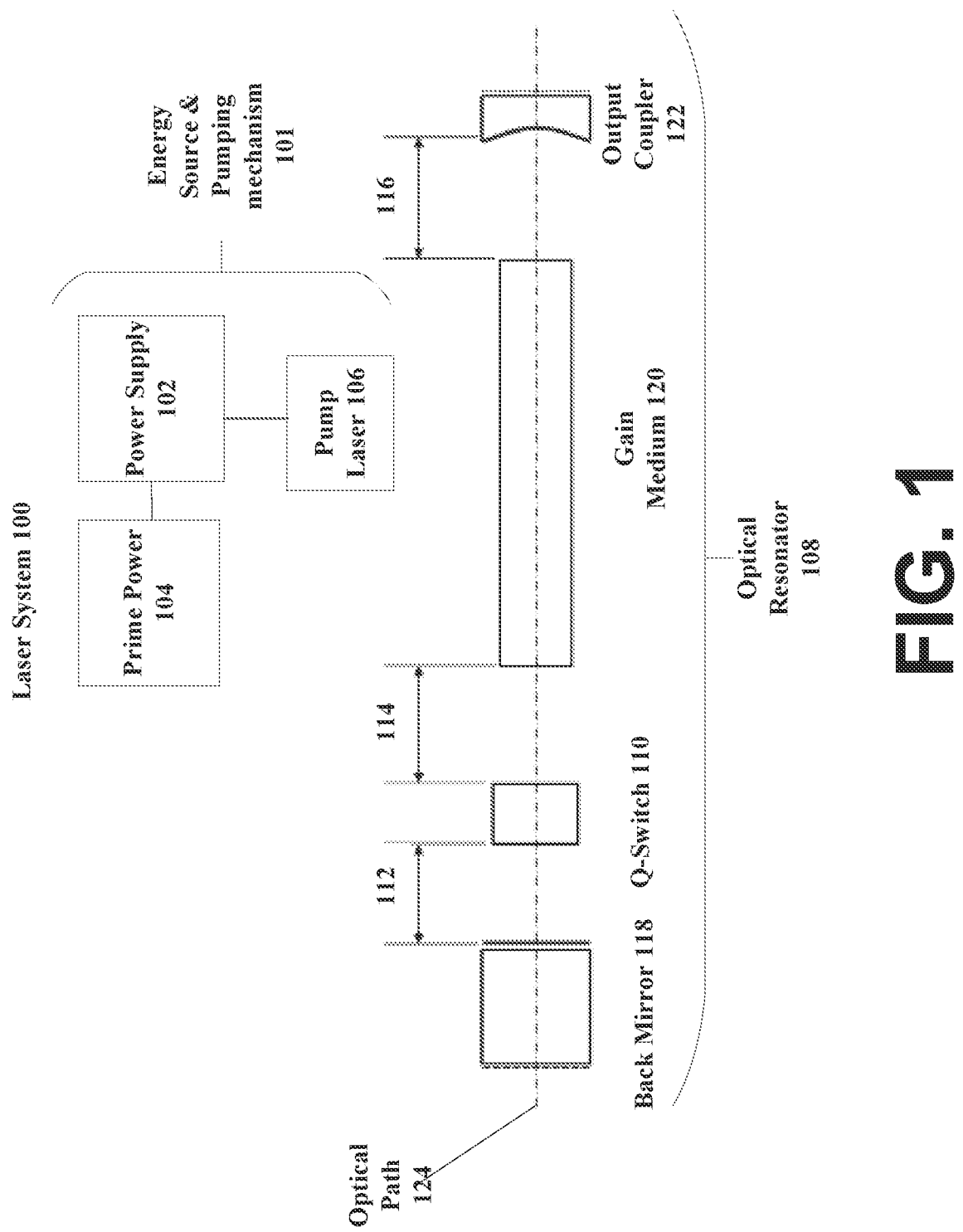
FIG. 1 shows an example laser system that comprises an optical resonator that may be reconfigurable.

A detailed description of illustrative embodiments will now be described with reference to the various Figures. Although this description provides a detailed example of possible implementations, it should be noted that the details are intended to be exemplary and in no way limit the scope of the application.

Methods, systems, and/or apparatus may be provided to adjust an optical path length of an optical resonator. In an example, a method may be provided to create an optical resonator and/or a laser system. In an example, a laser system may be provided. The laser system may comprise an optical resonator that may comprise an adjustable optical path.

An optical resonator may be provided. The optical resonator may comprise an adjustable optical path length. The optical resonator may include an output coupler. The output coupler may include a concave surface. The optical resonator may include a gain medium that may be a first distance from the output coupler along an optical path. The gain medium may include a glass doped with erbium. The optical resonator may include a back mirror. The back mirror may include a first back mirror surface and a second back mirror surface. The back mirror may be positioned a second distance from the gain medium along the optical path. The second distance may include a thickness of a Q-switch, a distance between the Q-switch and the gain medium, and a distance between the back mirror and the Q-switch. The first back mirror surface may include a high reflective coating. The first back mirror surface may provide a first optical path length for the optical resonator if the first back mirror surface may be included in the optical path. The second back mirror surface may include a low reflective coating. The second back mirror may provide a second optical path length for the optical resonator if the second back mirror surface is included in the optical path.

In an example, the second optical path length may be larger than the first optical path length. The first optical path length may include the first distance and the second distance. The second optical path length may include the first distance, the second distance, and a third distance. The third distance may be a distance between the first back mirror surface and the second back mirror surface.

In an example, the second distance may be maintained if the second back mirror surface is included in the optical path. For example, if the second back mirror surface is included in the optical path, the distance between the back mirror and the gain medium may be maintained and the optical path length, which may be the second optical path length, may be increased as compared to another optical path length, such as the first optical path length.

In an example, the optical resonator may include a Q-switch that may be disposed between the gain medium and the back mirror. In an example, the optical resonator may include a corner cube that may be disposed between the gain medium and the back mirror.

An optical resonator with an adjustable optical path length may be provided for a laser system. The optical resonator may include a gain medium, where the gain medium may comprise a glass doped with erbium, which may be referred to as erbium glass. The optical resonator may include a corner cube that may be a first distance from the gain medium along an optical path. The optical resonator may include a back mirror that may include a first back mirror surface and a second back mirror surface. The back mirror may be positioned a second distance from the corner cube along the optical path. The first back mirror surface may include a high reflective coating. The first back mirror surface may provide a first optical path length for the optical resonator if the first back mirror surface is included in the optical path.

The second back mirror surface may include a low reflective coating. The second back mirror surface may include may provide a second optical path length for the optical resonator if the second back mirror surface is included in the optical path.

In an example, the second optical path length may be larger than the first optical path length. The first optical path length may include the first distance and the second distance. The second optical path length may include the first distance, the second distance, and a third distance between the first back mirror surface and the second back mirror surface.

In an example, the second distance may be maintained if the second back mirror surface is included in the optical path. For example, the second back mirror surface is included in the optical path, the distance between the back mirror and the corner cube may be maintained along the optical path while the optical path length for the optical resonator, which may be the second optical path length, may be increased as compared to another optical path length, such as the first optical path length.

In an example, the optical resonator may further include a Q-switch that may be disposed between the gain medium and the corner cube. In another example, the optical resonator may further include a Q-switch that may be disposed between the output coupler and the gain medium.

A laser system with an adjustable optical path length may be provided. The laser system may include a pump source to energize the gain medium so that the gain medium may produce a laser. The laser system may include a gain medium for providing an optical gain for the beam. The gain medium may include a glass doped with erbium. The laser system may include a back mirror. The back mirror may provide a first optical path length for the laser system if placed in a first position and may provide a second optical path length for the laser system if placed in a second position.

In an example, the back mirror further may include a first surface with a high reflective coating and a second surface with a low reflective coating. In an example, the second optical path length may be larger than the first optical path length. In an example, the back mirror may be a distance from the gain medium and the distance is maintained if the back mirror is in the first position or the second position.

In an example, the laser system may include a corner cube that may be disposed between the back mirror and the gain medium. In another example, the laser system may include a corner cube that may be disposed between the gain medium and the output coupler.

A laser and/or a laser system may be provided. The laser may be an eye-safe laser. For example, such a laser system may be designed to operate at wavelengths that may be eye safe, such as 1550 nm (e.g., +/−100 nm).

The laser system may be installed in an environment with a large amount of environmental stress (e.g., near the engine of an automobile, in an outdoor environment, etc.). The laser system may be designed to be rugged while still meeting one or more performance requirements. For example, the laser system may be designed to remain operational across a temperature range, such as a temperature range of less than 0° F. to greater than 100° F. The size (e.g., overall size) of the laser system may be constrained, as there may be limited space available for housing the laser system.

Traditional laser systems may be made of expensive components and may be expensive to construct, assemble, and/or operate. For example, variability in the quality of laser components contribute to the difficulty of assembling a laser system. To account for the variability of laser components, a technician may need time (e.g., additional time) to adjust and/or assemble the laser system, which increases the overall cost of the laser system.

Many traditional laser systems are too large to be useful in a number of contexts. For a laser application to be commercially feasible, it may be desirable to design the laser system to be rugged, be relatively small, and use relatively low-cost components while still meeting one or more performance requirements. Additionally, although the laser system may operate relatively inefficiently (e.g., 10 W power input may result in approximately 400 mW output at a desired wavelength), the overall design may meet the ruggedness, size, weight, and cost requirements for a laser application.

Embodiment disclosed herein may provide improved laser performance while maintaining a volumetric footprint. For example, a laser may be provided to produce higher pulse energy at higher repetition rates than another eye-safe wavelength laser available in a similar volumetric footprint.

Laser system may include an adjustable optical path length. For example, the laser system may include an optical resonator that may allow the optical path length of the laser to be adjusted. Allowing the optical path length of the laser to be adjusted may address a number of manufacturing concerns. For example, allowing the optical path length of the laser to be adjusted may improve production yield and may minimize manufacturing costs.

An optical resonator that provides an adjustable optical path length may address laser performance issues that may be caused by one or more optical elements of the laser, such as a gain medium. For example, quality disparities between gain mediums may affect the performance of lasers being manufactured. A gain medium of a first quality (e.g., a high quality) may result in a laser that provides the requested performance. A gain medium of a second quality (e.g., a low quality) may result in a laser that may not provide the requested performance, or a laser that may not function. To address the quality disparities between gain mediums, gain mediums may be manipulated on the production floor (e.g., moving the gain medium around within an optical resonator), which may waste production time and money. For example, a technician may need to move a gain medium around within an optical resonator until the optical resonator is able to provide the requested performance. In an example, an optical resonator may be reconfigured to address a gain medium quality disparity and/or defect.

An optical resonator that provides an adjustable optical path length may address quality disparities between one or more optical elements, such as low quality gain media. For example, an optical resonator may be an adjustable optical resonator. The optical resonator may include a reconfigurable laser cavity that may allow the optical path length to be adjusted during production.

The reconfigurable laser cavity may provide the adjustable optical path length by allowing the optical elements of the reconfigurable laser cavity to be configured in a number of ways. In an example, the reconfigurable laser cavity may provide one or more configurations, such as four configurations. The one or more configurations may include one or more of a short cavity configuration, a semi-long cavity configuration, and/or a long cavity configuration. In example, the reconfigurable laser cavity may allow the optical elements to be configured a number of ways while maintaining a volumetric footprint of the laser system. For example, a distance between one or more of the optical elements within the reconfigurable laser cavity may be maintained while the optical path length may be changed (e.g., increased or decreased). In another example, a distance between one or more of the optical elements within the reconfigurable laser cavity may be changed while the optical path length may be changed (e.g., increased or decreased).

During production a technician may utilize one or more of the configurations of the reconfigurable laser cavity to produce a laser. For example, the technical may assemble and test a first configuration, which may be a short cavity configuration, as this may done at low cost (e.g., low number of components, easier to align, minimizes touch time, etc.). If the gain medium is of a higher quality this configuration may produce a laser of a requested performance. If the laser performance does not meet the requested performance, the technician may reconfigure the resonator to a second configuration, which may be a semi-long cavity configuration. The laser may be tested again. If the laser meets the requested performance, the laser fabrication may be completed. If the laser does not make the requested performance, the technician may reconfigure the resonator to a third configuration, which may be a long cavity configuration. The third configuration may use up more touch time (e.g., a technician may use up more time adjusting the laser) as compared to another configuration, such as the first configuration. The third configuration may add one or more components to reconfigurable laser cavity. If the laser meets the requested performance, then the laser fabrication may be complete. If third configuration does not meet the requested performance, the technician may technician may reconfigure the resonator to a fourth configuration.

FIG. 1 shows an example laser system that comprises an optical resonator that may be reconfigurable. An exemplary laser system may include one or more components. For example, laser system 100 may include one or more of a source of energy (e.g., prime power 104, power supply 102), a pumping mechanism (e.g., pump laser 106), a gain medium, a Q-switch, a back mirror, a corner cube, and/or an optical resonator (e.g., an optical cavity).

Laser system 100 may be designed to operate at wavelengths that may be eye safe, such as 1550 nm (e.g., +/−100 nm). In an example embodiment, to meet a requested performance, the laser system may be configured to operate at a between a single shot to a pulse repetition rate of 20 kHz or greater. The laser system may be configured to operate with a pulse width between less than 1 nsec to greater than 50 ns. The laser system may be configured to operate with a minimum pulse energy of at least 1 µJ.

As shown in FIG. 1, laser system 100 may include energy source & pumping mechanism 101. The energy source & pumping mechanism 101 may include prime power 104, power supply 102, and/or laser pump 106.

Laser system 100 may include power supply 102, which may be a laser power supply. Power supply 102 may receive power, such as prime power 104, from a power source. For example, power supply 102 may be plugged into a wall outlet and may receive power from the wall outlet. Power supply 102 may be and/or may be connected to a battery (e.g., a chemical battery). For example, power supply 102 may be a 12V battery. Power supply 102 may be provided by an electrical system and/or battery. Power supply 102 may provide energy to a pumping mechanism, which may be pump laser 106. Power supply 102 may be physically separated from the remainder of laser system 100. Physically separating power supply 102 from the remainder of laser system 100 may result in, for example, improved dissipation of heat generated by power supply 102. For example, physically separating power supply 102 from the remainder of the laser system may result in a lower operating temperature for the laser as power supply 102 may not send heat to the laser. Power supply 102 may be connected to pump laser 106 by, for example, an electrical cable.

Laser system 100 may include a pumping mechanism, which may be pump laser 106. Although pump laser 106 is shown with respect to FIG. 1, pump laser 106 may be replaced with another pumping mechanism such as, for example, a pump laser, an arc lamp, a flash lamp, another optical pumping mechanism, an electric current, an electron beam, and/or the like. The pumping mechanism, such as pump laser 106, may be made from a suitable material. The pumping mechanism (e.g. pump laser 106) may be, for example, a laser diode such as a direct diode laser. The laser diode may be configured to act as a continuous wave (CW) pump laser. The laser diode may be configured to act as a pulsed pump laser. As shown in FIG. 1, the pump laser 106 may receive power from the power supply. Pump laser 106 may be a continuous-wave pump laser. For example, pump laser 106 may continuously receive power and may emit a pump laser beam. Pump laser 106 may be configured to act as a pulsed laser. If the pump laser is pulsed, the pump pulses and output pulses may be substantially in phase with each other. The pumping mechanism may discharge heat to the environment. For example, pump laser 106 may discharge heat to the environment.

Pump laser 106 may generate a pump laser beam having one or more characteristics, such as a wavelength, phase, intensity, and/or the like. In an example, Pump laser 106 may operate at approximately 940 nm with an output power of approximately 300 W or less. The pump laser beam may be directed towards an optical resonator, such as optical resonator 108, and/or a gain medium, such as gain medium 120. Gain medium 120 may have a range for absorption, such 900 nm to 1000 nm.

Pump laser 106 may provide a pump laser beam that may have a constant intensity along a length of the gain medium, such as gain medium 120. The pump laser beam may be shaped such that the pump laser beam has a relatively constant size along a relatively narrow dimension. The relatively narrow dimension and the relatively wide dimension may be orthogonal to each other.

Laser system 100 may include optical resonator 108. Optical resonator 108 may include one or more optical components, such as back mirror 118, Q-switch 110, gain medium 120, and/or output coupler 122. The one or more optical components of optical resonator 108 may be aligned along an optical path, such as optical path 124. Optical path 124 may be a path that light and/or a beam, such a laser beam, may follow as it may pass through the optical resonator 108.

Back mirror 118 may be part of an optical cavity. Back mirror 118 may have a first surface and/or a second surface. The first surface and/or the second surface may be one or more of a flat surface, a curved surface, a concave surface, a convex surface, an optical surface, an anti-reflective coating, a low reflective coating, and/or a high reflective coating. In an example, the first surface may be a high reflective coating, and the second surface may be an anti-reflective coating and/or a low reflective coating. In an example, the first surface may be an anti-reflective coating and/or a low reflective coating, and the second surface may be a high reflective coating.

The first surface and/or the second surface may have a coating. In an example, the first surface and/or the second surface may have an anti-reflective coating, a low reflective coating and/or a high reflective coating. In an example, the first surface may have a high reflective coating, and the second surface may have a low reflective coating and/or an anti-reflective coating. In an example, the first surface may have a low reflective coating and/or an anti-reflective coating, and the second surface may have a high reflective coating.

Back mirror 118 may be made of a suitable material (e.g., glass, plastic, and/or the like). Back mirror 118 may be a distance 112 from Q-switch 110 within optical resonator 108. Back mirror 118 may be designed in such a way that back mirror 118 may be reconfigured within optical resonator 108. Back mirror 118 may include a first surface that may a distance away from a second surface such that back mirror 118 may provide optical resonator 108 with one or more optical path length. In an example, if the first surface of back mirror 118 is included in optical path 124, optical resonator 108 may have a first optical path length. In an example, if the second service of black mirror 118 is included in optical path 124, optical resonator 108 may have a second optical path length. The first optical path length and the second optical path length may be different.

Back mirror 118 may be curved and may have a degree of curvature that results in the laser beam being focused by an appropriate amount inside optical resonator 108. The degree of curvature may be tested to ensure that back mirror 118 works with the laser system to produce an output laser beam having desired characteristics. Back mirror 118 may be used to focus or otherwise converge the laser beam inside optical resonator 108. In an example, back mirror 118 may be used to diverge the laser beam inside optical resonator 108. Back mirror 118 may have a body, which may be between a first surface and a second surface of back mirror 118. Back mirror 118 may reflect light and/or a beam (e.g., a laser beam) received from Q-switch 110 back into Q-switch 110.

The optical resonator 108 may include Q-switch 110. Q-switch 110 may be included in optical path 124. Q-switch 110 may be distance 112 from back mirror 118. Q-switch 110 may be distance 114 from gain medium 120. Q-switch 110 may be a distance from output coupler 112. Q-switch 110 may be made of a suitable material, such as glass with an appropriate coating, plastic with an appropriate coating, glass doped with appropriate materials, spinel doped with cobalt, and/or the like. In an example, Q-switch 110 may receive light and/or a beam (e.g., a laser beam) from gain medium gain medium 120 and/or a surface of the back mirror 118. In an example, Q-switch 110 may receive light and/or a beam (e.g., a laser beam) from output coupler 112. Q-switch 110 may operate upon intra cavity laser beam, which may result in increased intensity of the output laser beam. Q-switch 110 may be an active Q-switch. Q-switch 110 may be a passive Q-switch. The passive Q-switch may have increased transmission for higher intensities of light, which may result in the passive Q-switch transmitting the output laser beam once the output laser beam has reached a given intensity. Using a passive Q-switch may result in increased peak power for the output laser beam when transmitted by the Q-switch.

The optical resonator 108 may include gain medium 120. Gain medium 120 may have the shape of a rectangular prism, with one or more relatively narrow dimensions and one or more relatively wide dimensions. For example, gain medium 120 may have a relatively low height, and a relatively high width and length. The pump laser beam may have a relatively constant size in the height dimension and may converge or diverge in the width dimension and/or the length dimension.

Gain medium 120 may be made of a suitable material. For example, gain medium 120 may be made of glass doped with erbium and/or ytterbium. For example, gain medium 120 may be doped with erbium at a level of at a level of 0.2 wt % to 5 wt %. Gain medium 120 may be doped with ytterbium at a level of 2 wt % to 50 wt %. Gain medium 120 may receive the light and/or a beam (e.g., a laser beam) from Q-switch 110 and/or output coupler 112. Gain medium 120 may receive pump laser beam from pump laser 106, and gain medium 120 may generate an output laser beam having one or more desired characteristics (e.g., wavelength, phase, intensity, and/or the like). Gain medium 120 may have the shape of, for example, a rectangular prism. Gain medium 120 may be a rectangular cuboid, which may have a width within a range from 1 mm-50 mm, a height within a range from 0.1 mm to 2 mm, and a length within a range from 1 mm to 20 mm. Having a relatively narrow gain medium may result in increased efficiency and waste heat dissipation. A relatively small gain medium size may help the laser system meet size, weight and/or cost requirements for a requested laser performance.

Gain medium 120 may be made up a number of materials. For example, gain medium 120 may be made of a glass, a plastic, a combination thereof, and/or the like. Gain medium 120 may be made of an erbium glass.

The optical resonator 108 may include output coupler 122. Output coupler 122 may be distance 116 from gain medium 120. Output coupler 122 may be made of a suitable material, such as glass with a reflective coating, plastic with a reflective coating, glass doped with appropriate materials, spinel doped with cobalt, and/or the like. Output coupler 122 may receive light and/or a beam (e.g., a laser beam) from a surface of gain medium 120. Output coupler 122 may reflect some or most of the output laser beam into gain medium 120, which may result in increased intensity of the light and/or the beam (e.g., laser beam).

Output coupler 122 may include a first surface and/or a second surface. The first surface may be a concave lens surface, a flat lens, a convex lens, and/or the like. For example, the first surface may be a concave lens surface. The second surface may be a concave lens surface, a planar surface, a convex surface and/or the like. For example, the second service may be a planar surface.

Figure 2:
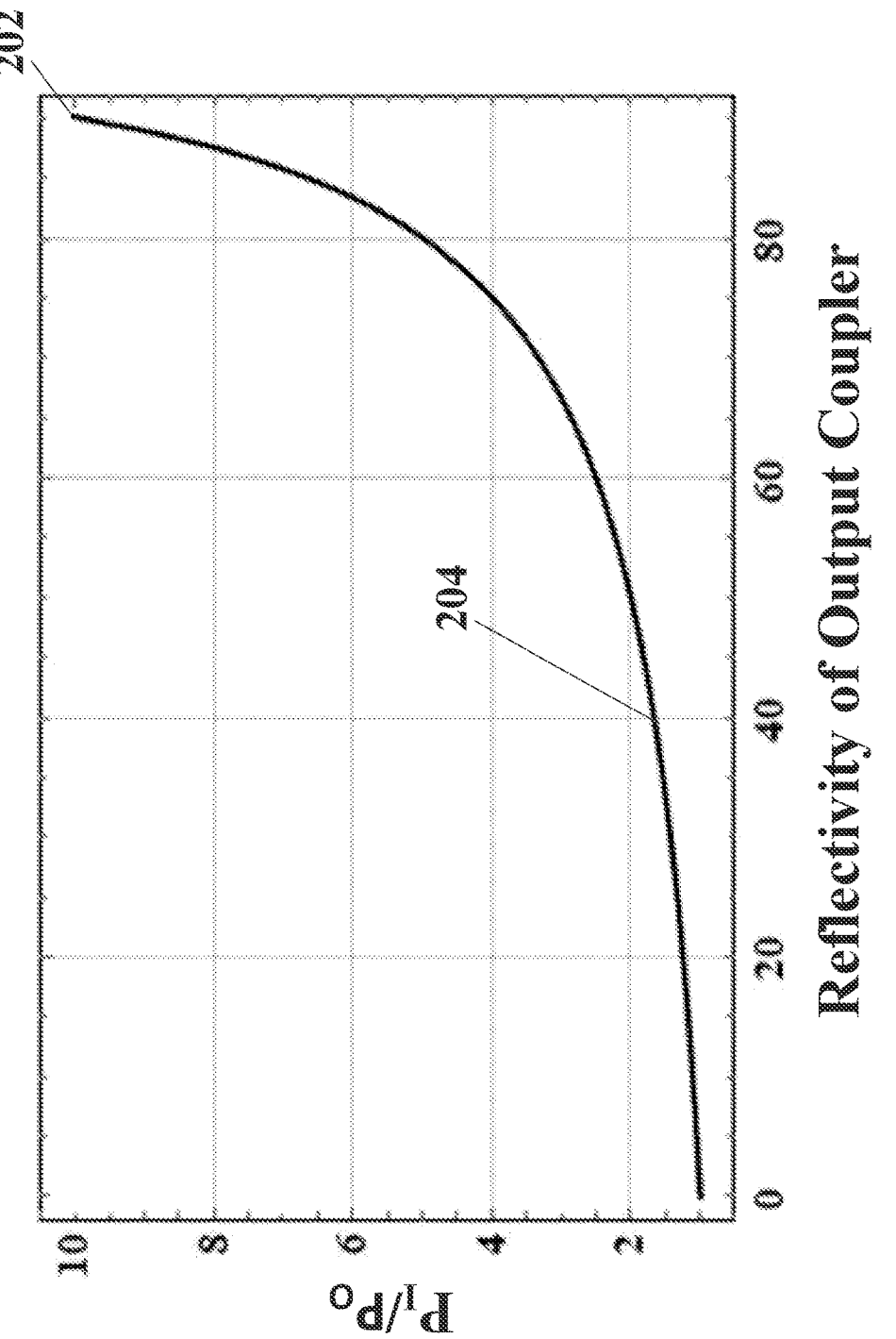
FIG. 2 is a graph of example ratios of intra-cavity optical power to output optical power versus output coupler reflectivity.

The first surface and/or the second surfaced of output coupler 122 may be an anti-reflective coating, a low reflective coating, and/or a high reflective coating. The first surface and/or the second surface of output coupler 122 may include an anti-reflective coating, a low reflective coating and/or a high reflective coating. The reflectivity of the coating and/or surface may be any of the examples described herein, for example, such as those as shown in FIG. 2. In an example, a surface of output coupler 122 may have a reflectivity that may be within a range from <20% reflectivity to >90% reflectivity.

FIG. 2 is a graph of example ratios of intra-cavity optical power to an output optical power versus output coupler reflectivity. In an example, the laser may be an erbium glass laser. For example, a laser system may be provided that may include a gain medium that may comprise erbium glass. A performance of an erbium glass laser may be affected by the gain host (e.g., glass), as the gain host may be a thermal insulator which may reduce performance. A method to improve performance of the laser, which may be affected by a low thermal conductivity of the gain host, may be to make the gain host (e.g., glass) thin. This may reduce the path length for the heat to leave the gain host and may aid laser performance.

A performance of the laser may be affected by an intra-cavity power of the laser. For example, a high intra-cavity power in a small diameter beam may cause damage to the components inside the cavity. A high reflectivity output coupler may make the intra-cavity optical power higher (e.g., much higher) than the output power. A low reflectivity output coupler may make the intra-cavity optical power close to the output power. As shown in FIG. 2, cavity mirror reflectivity may affect the ratio of intra-cavity optical power to output optical power as provided by Equation 1:

$$\frac{P_I}{P_O} = \frac{1}{1 - R} \qquad \text{Equation 1}$$

wherein $P_I$ may be the intra-cavity optical power, $P_O$ may be the output optical power, and R may be a reflectivity of an output mirror (e.g., an output coupler, a back mirror, a combination thereof, and the like).

A performance of an erbium glass laser may be affected by the gain medium (e.g., a gain medium that comprises erbium), as the gain medium may have a low gain. To address the low gain, an output mirror of the laser may be adjusted such that the output mirror has a high reflectivity, such as a 90% reflectivity. A high reflectivity of the output mirror may allow the optical power inside the laser to be higher, such as 10× higher, than the optical output power of the laser. For example, as shown at 202, a reflectivity of 90% may allow the intra-cavity optical power to be 10× higher than the output optical power.

In an example, the ratio of the intra-cavity optical power to the output optical power may be made low, for example, by adjusting the output mirror such that the output mirror has a low reflectivity.

In an example, the output power of a laser with a low ratio of inter-cavity optical power to optical output power $$\left(\text{e.g., } \frac{P_I}{P_O}\right)$$

may be increased for example by increasing the path length of the gain medium. This may allow for the output of the laser to be increased while keeping the reflectivity of the optical mirror low, such as below 40%. For example, a laser system may be designed with an output coupler that may have a reflectivity within a range of 20-40%, such as at 40% shown at 204.

Figure 3:
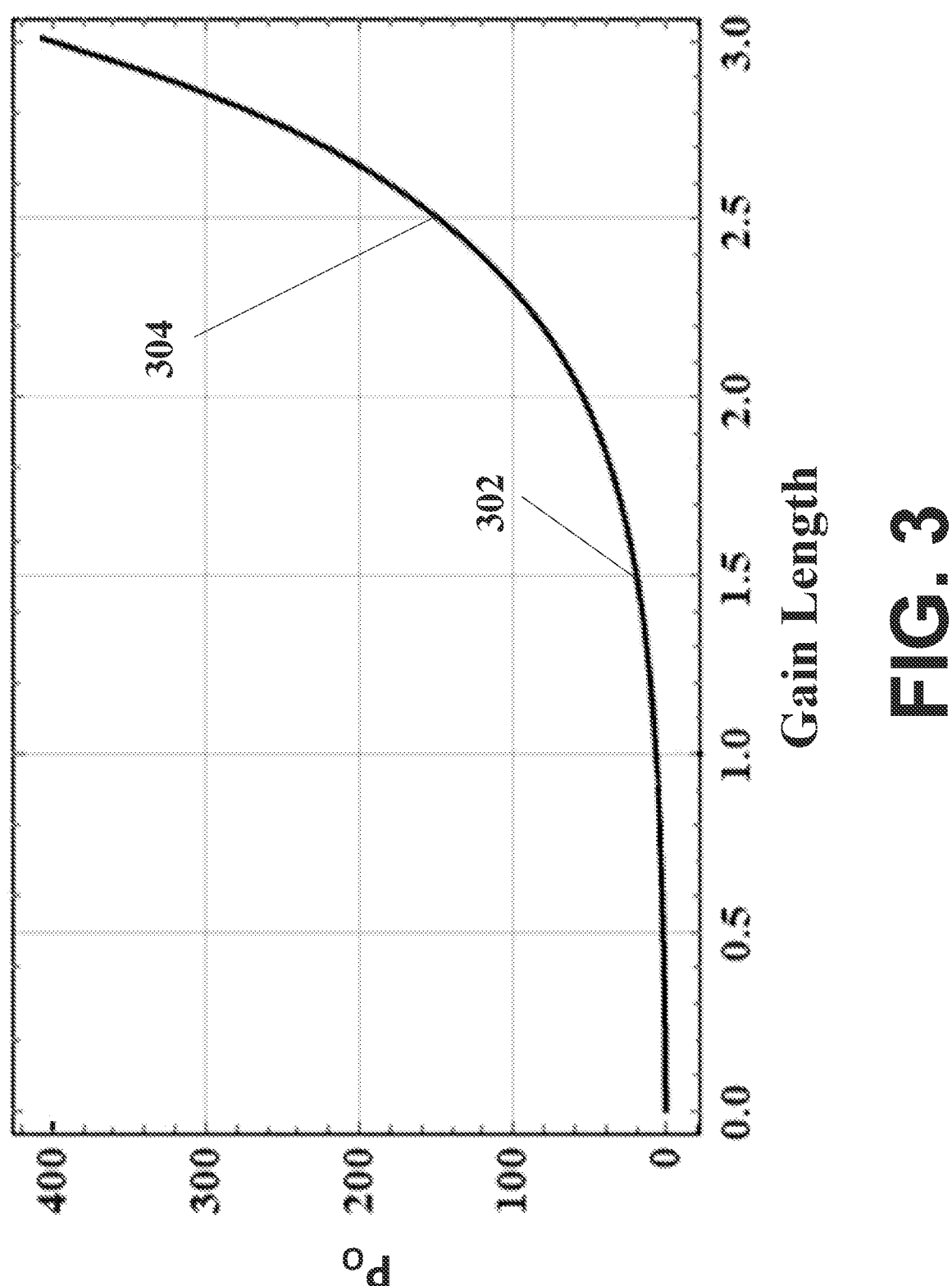
FIG. 3 is a graph of example ratios of output power to path length of a gain medium.

FIG. 3 is a graph of example ratios of output power to path length of a gain medium. As shown in FIG. 3, a length of a gain medium may affect the output power of a laser. For example, the length of a gain medium may affect the output of a laser as provided by Equation 2:

$$P_O \cong R1 R2 e^{2L(g-\alpha)} \qquad \text{Equation 2}$$

wherein $P_O$ may be the output optical power, R1 may be a value of reflectivity of an output coupler (e.g., as shown in FIG. 2), R2 may be a value of reflectivity of a back mirror, L may be the length of the gain medium (e.g., a gain length), g may be a gain coefficient, and $\alpha$ may be a summed cavity loss (e.g., a loss due to one or more optical elements within the optical resonator).

In an example, the reflectivity of a back mirror may be nominally $\infty$, and a value of 1 may be used for R2. In an example, $\alpha$ may be a small number when the gain medium comprises erbium. In an example, L may be a powerful contributor to laser gain as it is in the exponent of Equation 2.

As the gain length may be used to affect the output optical power, the gain length may be adjusted to increase and/or decrease the output optical power. For example, the length of the gain medium may be increased by a factor to increase the output optical power. As another example, the length of the gain medium may be decreased to reduce the output optical power.

As the gain medium of an erbium glass laser may have a low gain, the length of that gain medium may be increased to increase the output optical power of an erbium glass laser. In an example, a laser may have a gain length medium within a range of 0.5 cm to 3.0 cm. For example, as shown in FIG. 3 at 302, a laser (e.g., an erbium glass laser) may have a gain length medium of 1.5 and the output optical power of the laser may be 20. If the gain medium of the laser were to be increased, then the laser may produce a higher output optical power. In an example, at 304, length of the gain medium may be 2.5 and the output optical power of the laser may be 150.

The length of a gain medium may be increased by a factor so as to produce a multiple gain in output optical power. For example, increasing the gain length linearly may cause an exponential increase in the gain.

In an example, the output power of a laser with a low ratio of inter-cavity optical power to optical output power $$\left(\text{e.g., } \frac{P_I}{P_O}\right)$$

may be increased for example by increasing the path length of the gain medium. This may allow for the output of the laser to be increased while keeping the reflectivity of the optical mirror low, such as below 40%.

Examples herein describe lasers providing advantages such as high production yield and low production cost, leading to more efficient production. The lasers may be built based on erbium glass. Glass, having low thermal conductivity, may heat up to hot temperatures when operating the lasers. At high enough temperatures, laser performance may degrade. To help counteract the heat, the glass may be cut thin, which may allow the heat a shorter path to exit the laser, helping the laser stay cool. Erbium, which may be the gain medium for the laser, may be a low gain. The low gain of erbium may be combined with an output mirror to that may have a high reflectivity (e.g., 90% reflectivity). The high reflectivity of the mirror may lead the optical power inside of the laser to be much higher than the optical output power of the laser (e.g., such as about 10 times higher). As such, these erbium lasers may include a high power beam in a small diameter, which due to the thin glass, may greatly limits the output power due to the limited damage threshold of the optical components that make up the laser.

Examples herein act to lower the ratio of the optical power inside of the laser to the optical output power of the laser. For example, instead of a higher (e.g., ~90%) reflectivity mirror which may make the ratio high (e.g., ~10) for the optical power inside of the laser to the optical output power of the laser, lower (e.g., ~30%) reflectivity output couplers may be used which may make the ratio low (e.g., less than two) for the optical power inside of the laser to the optical output power of the laser. As such, the energy inside the laser may be lower (e.g., less than twice the amount) while the power at the outside of the laser may be constant. Additionally, the output power of the laser may be increased by increasing the path length of the gain medium. As such, lasers with longer cavities may be used to increase the output power of the laser.

In examples, during production, the lasers may allow for a dynamic input during the fabrication of the lasers, which may maximize their yield. The fabrication may be done by Adjusting one or more optical elements that are part of the laser. As technician adjust an optical elements, if the performance of the laser is inadequate, the technician may further adjust the optical element until the performance of the lasers is adequate. The production yield would increase by given production teams the opportunity to make adjustments during fabrication. In examples, adjustments to the one or more optical elements may include adjusting the cavity length, adding a component, removing a component, changing a configuration of a component, a combination thereof, and/or the like.

There may be multiple cavity lengths for the optical resonator, as described herein. In examples, the cavity lengths may be changed by changing the distances optical path length of the optical resonator. In examples, the cavity lengths may be changed by changing the distance between the output coupler, the Q-switch, and/or back mirror. In examples, the cavity lengths and/or optical path lengths may be changed without changing the distance between the output coupler, the Q-switch, and/or back mirror. As described herein, the cavity lengths may be associated with one or more configurations of an optical resonator. The cavity lengths and/or optical path lengths may include a short cavity length (e.g., a short optical path length), a semi-long cavity length (e.g., a semi-long cavity length), and one or more a long cavity lengths (e.g., a long optical path lengths). The cavity lengths may fit inside of a laser case. For example, volumetric size of a laser case may not change even though the configuration of the optical resonator may be different to provide a different optical path length and/or optical cavity length.

Figure 4:
FIG. 4 shows an example laser system that comprises an optical resonator in a first configuration that may provide an adjustable optical path length and/or resonator cavity length.

FIG. 4 shows an example laser system that comprises an optical resonator in a first configuration that may provide an adjustable optical path length and/or resonator cavity length. As shown in FIG. 4, laser system 100 may have an adjustable optical path length and/or resonator cavity length. For example, laser system 100 may be placed in a first configuration to provide a first optical resonator cavity length. The first configuration may be provided by configuration of optical resonator 408 as described herein. For the purposes of simplicity, laser system 100 is shown FIG. 4 without energy source & pumping mechanism 101 and with configuration of optical resonator 408.

The configuration of the resonator 408 may provide first cavity length, which may be a short cavity, and/or a first optical path length, such as a short optical path length. In examples, a short cavity length and/or short optical path length may refer to a length in comparison to another length provided by another configuration (e.g., a length shorter than an optical path length provided by another configuration).

The configuration of optical resonator 408 may provide a cavity length (e.g., a short cavity length) and/or an optical path length (e.g., short optical path length). This may be a length (e.g., a default cavity length) where the fabrication may start.

As shown in FIG. 4, back mirror 118 may include an anti-refection (AR) (e.g., a low reflective surface) surface 404 and high reflection (HR) surface 408. AR surface 404 may be separated by HR surface 408 by mirror thickness 406. As shown in FIG. 4, the back mirror 118 may be placed in a first configuration, which may be referred to as a short cavity configuration, where AR side (e.g., AR surface 404) of the back mirror may be further from the output coupler 122 while the high reflection (HR) side (e.g., HR surface 408) of back mirror 118 may be closer to the output coupler 122.

As shown in FIG. 4, optical path 424 may be a path that light and/or a beam, such a laser beam, may follow as it may pass through the configuration of optical resonator 408. The path length of optical path 424 may be different than the path length provided by optical path 524 shown with respect to FIG. 5 (e.g., configuration of optical resonator 508), optical path 624 shown with respect to FIG. 6 (e.g., configuration of optical resonator 608), and/or optical path 824 shown with respect to FIG. 8 (e.g., configuration of optical resonator 808).

As shown in FIG. 4 by optical path 424, light and/or a beam may follow from the HR surface 408 of back mirror 118, through Q-switch 110, through gain medium 120, and through optical coupler 122. In an example, a length of optical path 424 may be affected by the length of the path, one or more optical components that may be included in optical path 424, and/or the composition of the one or more optical components. For example, a substrate of Q-switch 110, gain medium 120, and/or output coupler 122 may affect the length of optical path 424.

A length of optical path 424 may be provided by configuration of optical resonator 408. The length of optical path 424 may be set based on configuration of optical resonator 408 and/or the composition (e.g., substrate material) of one or more components of optical resonator 408. In an example, the length of optical path 424 may be a first optical path length if the HR surface 408 of back mirror 118 is included in optical path 424 such that a beam may reflect off of HR surface 408 before passing through the substrate of back mirror 118.

In an example, Q-switch 110 may be placed at any location within configuration of optical resonator 408, such that Q-switch 110 may be included in optical path 424. In an example, Q-switch 110 may be disposed between gain medium 120 and back mirror 118. In an example, Q-switch 110 may be disposed between gain medium 120 and coupler 122.

As described herein, the optical resonator of laser system 100 may be reconfigured into a number of configurations. For example, the optical resonator may be configured into a second configuration, which may provide a second optical path length (e.g., a semi-long cavity length).

Figure 5:
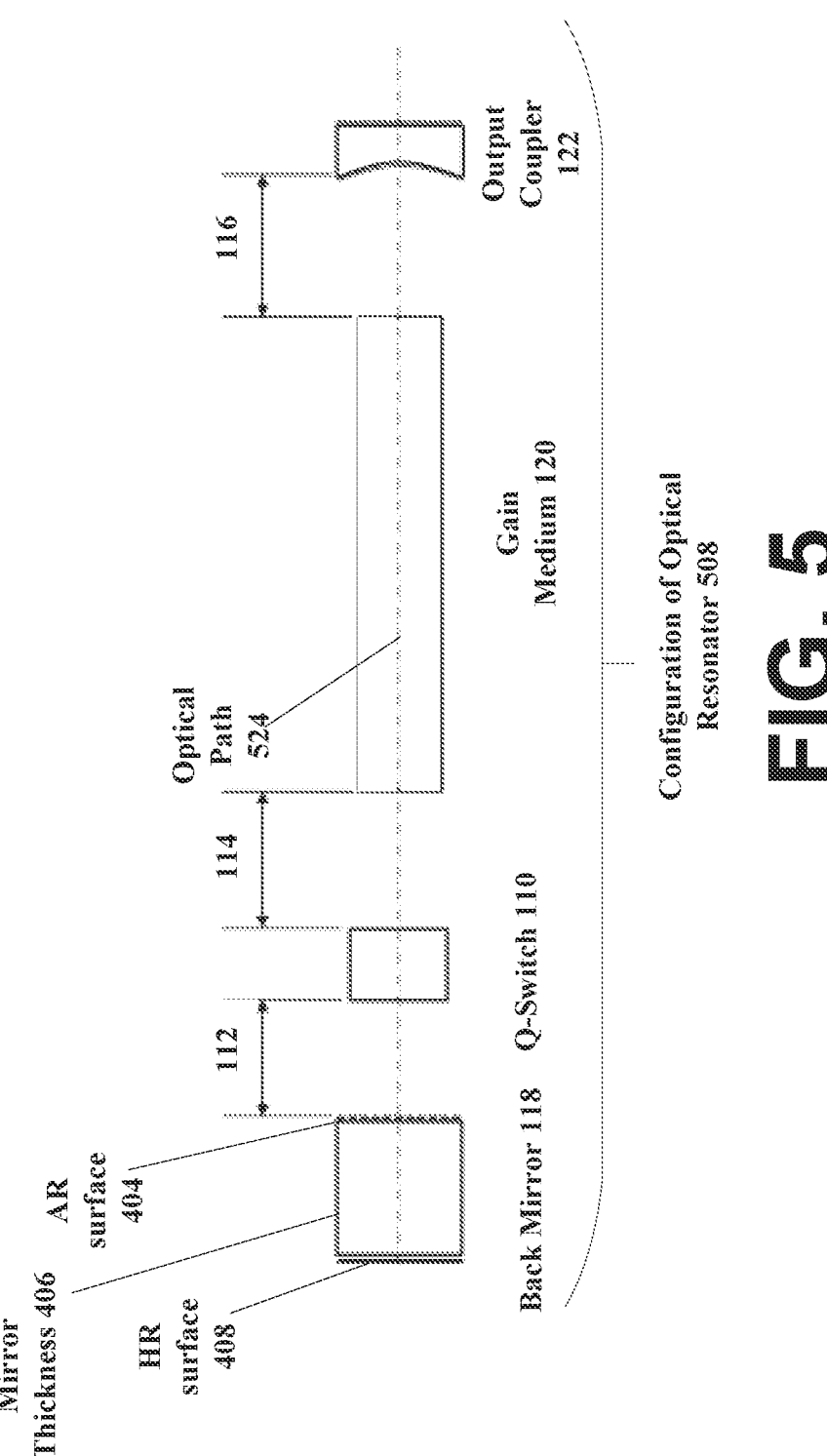
FIG. 5 shows an example laser system that comprises an optical resonator in a second configuration that may provide an adjustable optical path length and/or resonator cavity length.

FIG. 5 shows an example laser system that comprises an optical resonator in a second configuration that may provide an adjustable optical path length and/or resonator cavity length.

As shown in FIG. 5, laser system 100 may have an adjustable optical path length and/or resonator cavity length. For example, laser system 100 may be placed in a second configuration to provide a second optical resonator cavity length. The second configuration may be provided by configuration of optical resonator 508 as described herein. For the purposes of simplicity, laser system 100 is shown FIG. 5 without energy source & pumping mechanism 101 and with configuration of optical resonator 508.

The configuration of the resonator 508 may provide a second cavity length, which may be a semi-long cavity, and/or a second optical path length, such as a semi-long optical path length. In examples, a semi-long cavity length and/or semi-long optical path length may refer to a length in comparison to another length provided by another configuration (e.g., a length shorter and/or longer than an optical path length provided by another configuration).

Configuration of optical resonator 508 may be a semi-long cavity and may have similar optical components (e.g., laser component) as configuration of optical resonator 408 (e.g., a first configuration and/or a short cavity length). Configuration of optical resonator 508 may include a configuration of back mirror 118 that is different than that of configuration of optical resonator 408. As shown in FIG. 5, the back mirror may be flipped and/or repositioned in configuration of optical resonator 508. For example, referring to FIG. 4, in optical resonator 408 (e.g., the short cavity), the AR side (e.g., AR surface 404) of back mirror 118 may be further from output coupler 122 while the HR (e.g., HR surface 408) side of back mirror 118 may be closer to output coupler 122. Referring again to FIG. 5, in configuration of optical resonator 508 (e.g., the semi-long cavity), the HR side (e.g., HR surface 408) of back mirror 118 may be further from the output coupler 122 while the AR side (e.g., AR surface 404) of back mirror 118 may be closer to the output coupler 122.

In FIG. 5, the cavity length and/or optical path length, such as the length of optical path 524, may be determined by the thickness of back mirror 118 (e.g., mirror thickness 406) times the index of refraction of the mirror substrate. For example, the substrate of mirror 118 may be selected so as to increase the length of optical path 524 when the substrate is included in optical path 524.

In an example, Q-switch 110 may be placed at any location within configuration of optical resonator 508, such that Q-switch 110 may be included in optical path 524. For example, referring to FIG. 5, in an example, Q-switch 110 may be disposed between gain medium 120 and back mirror

118. In an example, Q-switch 110 may be disposed between gain medium 120 and output coupler 122.

Referring to FIGS. 4 and 5, HR surface 408 may have a high reflectivity, meaning less light may pass through that side of back mirror 118. AR surface 404 may have a low reflectivity, meaning more light may pass through that side of back mirror 118. In FIGS. 4 and 5, the positioning of HR surface 408 of back mirror 118 may affect the cavity length because most of the light may reflect off HR surface 408 of back mirror 118, meaning less light may pass through at that point. The AR surface 404 may allow more light to pass right through that side of mirror 118.

In FIG. 4, HR surface 408 may be positioned closer to the Q-switch 110, which may establish the length of optical path 424 (e.g., making the cavity short, as compared to other cavity lengths) since the light may stop passing through at a closer distance to output coupler 122. For example, optical path 424 may be a path that light and/or a beam, such a laser beam, may follow as it may pass through the configuration of optical resonator 408. As shown in FIG. 4 by optical path 424, light and/or a beam may follow from the HR surface 408 of back mirror 118, through Q-switch 110, through gain medium 120, and through optical coupler 122. In an example, optical resonator 408 provides a first optical path length if the HR surface 408 of back mirror 118 is included in optical path 424.

In FIG. 5, the configuration of optical resonator 508 (e.g., a semi-long cavity configuration) may position HR surface 408 further away from output coupler 122, which may make the configuration of optical resonator 508 longer than the configuration of optical resonator 408 (shown with respect to FIG. 4) since the light stops passing through at a longer distance from the output coupler 122 in FIG. 5. Optical path 524 may be a path that light and/or a beam, such a laser beam, may follow as it may pass through the configuration of optical resonator 508. As shown in FIG. 5 by optical path 524, light and/or a beam may follow from the HR surface 408 of back mirror 118, through mirror thickness 408, through AR surface 404, through Q-switch 110, through gain medium 120, and through optical coupler 122. In an example, optical resonator 508 provides a second optical path length if the AR surface 404 of back mirror 118 is included in optical path 424, as light and/or a beam may pass though AR surface 404 and be reflected back by HR surface 408. The mirror thickness 406 and/or substrate of back mirror 118 may affect the second optical path length. For example, the length of optical path 524, may be affected by the thickness of back mirror 118 (e.g., mirror thickness 406) times the index of refraction of the mirror substrate.

As described herein, the optical resonator of laser system 100 may be reconfigured into a number of configurations. For example, the optical resonator may be configured into a third configuration, which may provide a third optical path length (e.g., a long cavity length).

Figure 6:
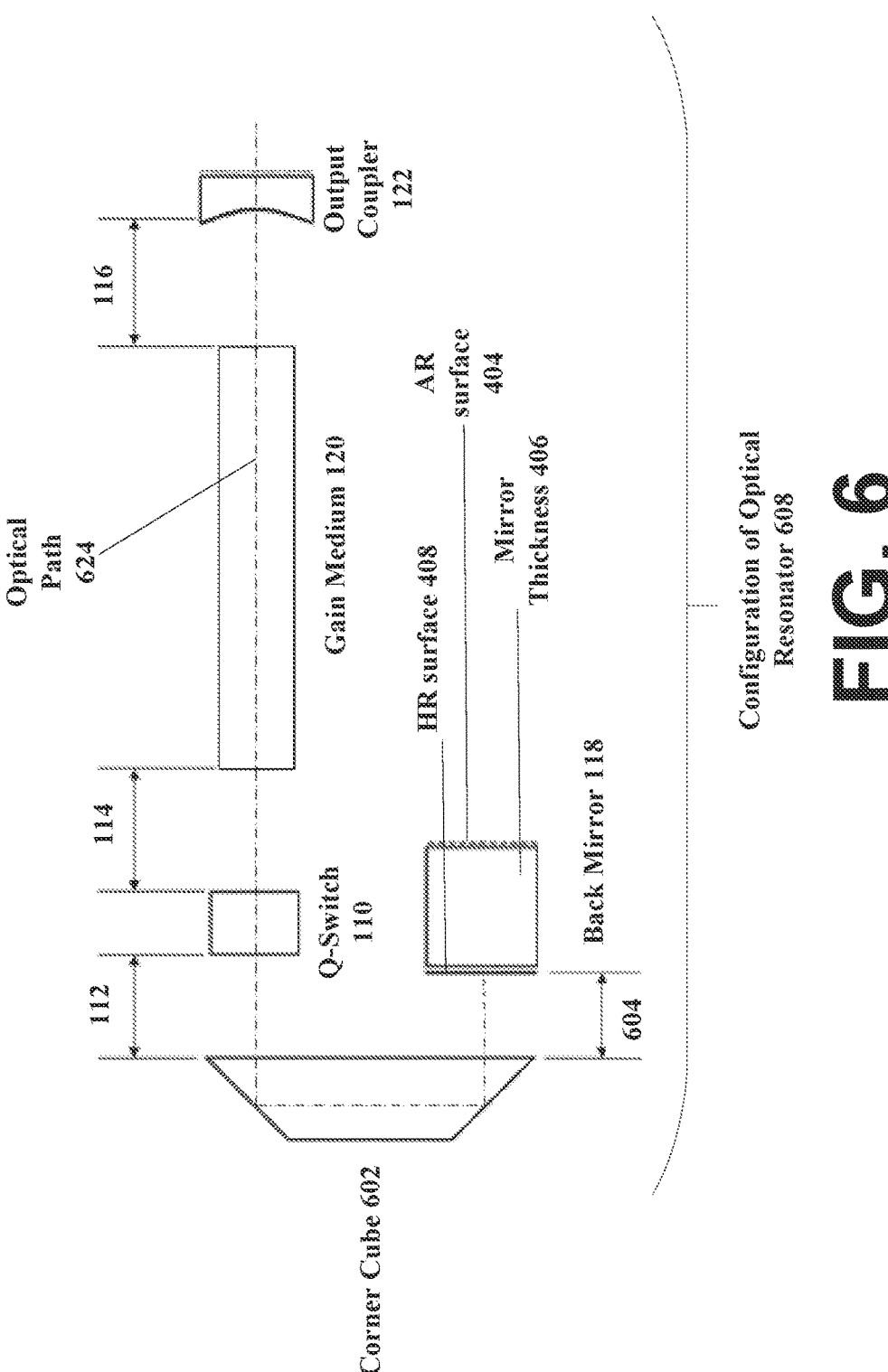
FIG. 6 shows an example laser system that comprises an optical resonator in a third configuration that may provide an adjustable optical path length and/or resonator cavity length.

FIG. 6 shows an example laser system that comprises an optical resonator in a third configuration that may provide an adjustable optical path length and/or resonator cavity length.

As shown in FIG. 6, laser system 100 may have an adjustable optical path length and/or resonator cavity length. For example, laser system 100 may be placed in a third configuration (e.g., a long cavity configuration) to provide a third optical resonator cavity length (e.g., a long cavity length. The third configuration may be provided by configuration of optical resonator 608 as described herein. For the purposes of simplicity, laser system 100 is shown in FIG. 6 without energy source & pumping mechanism 101 and with configuration of optical resonator 608.

If, for example during manufacturing, the performance of laser system 100 is inadequate, the optical resonator of laser system 100 may be configured using configuration of optical resonator 608. In configuration of optical resonator 608 (e.g., a long cavity example), a corner cube, such as corner cube 602, may be used by laser system 100. Corner cube 602 may be made of a suitable material. For example, corner cube 602 may be made of glass, plastic, and/or the like. The substrate of corner cube 602 and/or the thickness of corner cube 602 may affect the length of optical path 624. For example, the length of optical path 624, may be affected by the thickness of corner cube 602 times the index of refraction of the substrate of corner cube 602.

Corner cube 602 may be placed at any location within configuration of optical resonator 608, such that corner cube 602 may be included in optical path 624. In an example, corner cube 602 may be placed between gain medium 120 and output coupler 122. In an example, corner cube 602 may be placed between Q-switch 110 and gain medium 120. In an example, corner cube 602 may be placed between Q-Switch 110 and back mirror 118. In an example, corner cube 602 may be placed distance 604 from back mirror 118 and distance 112 from Q-switch 110.

In an example, Q-switch 110 may be placed at any location within configuration of optical resonator 608, such that Q-switch 110 may be included in optical path 624. In an example, Q-switch 110 may be disposed between gain medium 120 and output coupler 122. In an example, Q-switch 110 may be placed between back mirror 118 and corner cube 602. In an example, such as shown in FIG. 6, Q-switch 110 may be disposed between gain medium 120 and corner cube 602.

Corner cube 602 may act to increase the optical path length and/or optical resonator cavity length by causing light path and/or a beam path (e.g., a laser path) to wrap around laser 100. For example, corner cube 602 to optical path 624 wrap around laser system 100. This may be accomplished due to the shape of the corner cube, which may cause light and/or a beam (e.g., a laser beam) to reflect towards back mirror 118 and/or to reflect towards the output coupler 122.

Optical path 624 may be a path that light and/or a beam, such a laser beam, may follow as it may pass through configuration of optical resonator 608. As shown in FIG. 6 by optical path 624, light and/or a beam may follow from the HR surface 408 of back mirror 118, through corner cube 602, through Q-switch 110, through gain medium 120, and through optical coupler 122. In an example, configuration of optical resonator 608 may provide a third optical path length if the corner cube 602 and/or HR surface 408 of back mirror 118 is included in optical path 624, as light and/or a beam.

Corner cube 602 may change with the shape of the case of the laser. Corner cube 602 may be any of a number of shapes that may suite a volumetric footprint of a case associated with laser system 100. For example, corner cube 602 may be a prism. The material making up the corner cube may be selected to have an impact on path length. The material making up the corner cube may be selected according to an index of the material. For example, the material making up the corner cube may have a moderately low index, such as calcium fluoride; may have a moderately high index, such as zinc selenide; and/or the like.

Corner cube 602 may experience a change of angle due to thermal expansion of its mount. For example, corner cube 602 may experience a change of mounting angle high temperatures due to uneven thermal expansion of its mounting fixture. As the corner cube changes angle, its angle of incidence may change. However, despite the angle of incidence of the corner cube changing, the light may still enter and exit the corner cube at or near a similar angle, which may maintain the optical alignment and performance of laser system 100. In an example, the light entering and/or existing the corner cube may be parallel regardless of the angle of the corner cube.

In configuration of optical resonator 608, back mirror 118 may be moved closer to the output coupler 112, which may shorten the length between them. For example, distance 112, distance 114, distance 116, and/or distance 604 may be adjusted such that back mirror 118 may be moved closer to output coupler 112. This may be done, for example, if optical components of the optical resonator, such as back mirror 118 and output coupler 112, are mounted onto an optical breadboard. The optical breadboard may be designed to bend less than the laser case at high temperatures due to uneven thermal expansion. The optical breadboard may still bend some amount. For example, the amount the optical breadboard bends may be greater at or near one or more of the ends of the optical breadboard and may be less at or near the center. As such, when back mirror 118 and output coupler 122 are positioned closer together on the optical breadboard, the angle between them may be small (e.g., very small or near flat) compared to if they are positioned further away. This may improve the optical alignment and laser performance of laser system 100 as the beam light may more accurately travel between back mirror 118 and output coupler 122.

Figure 7:
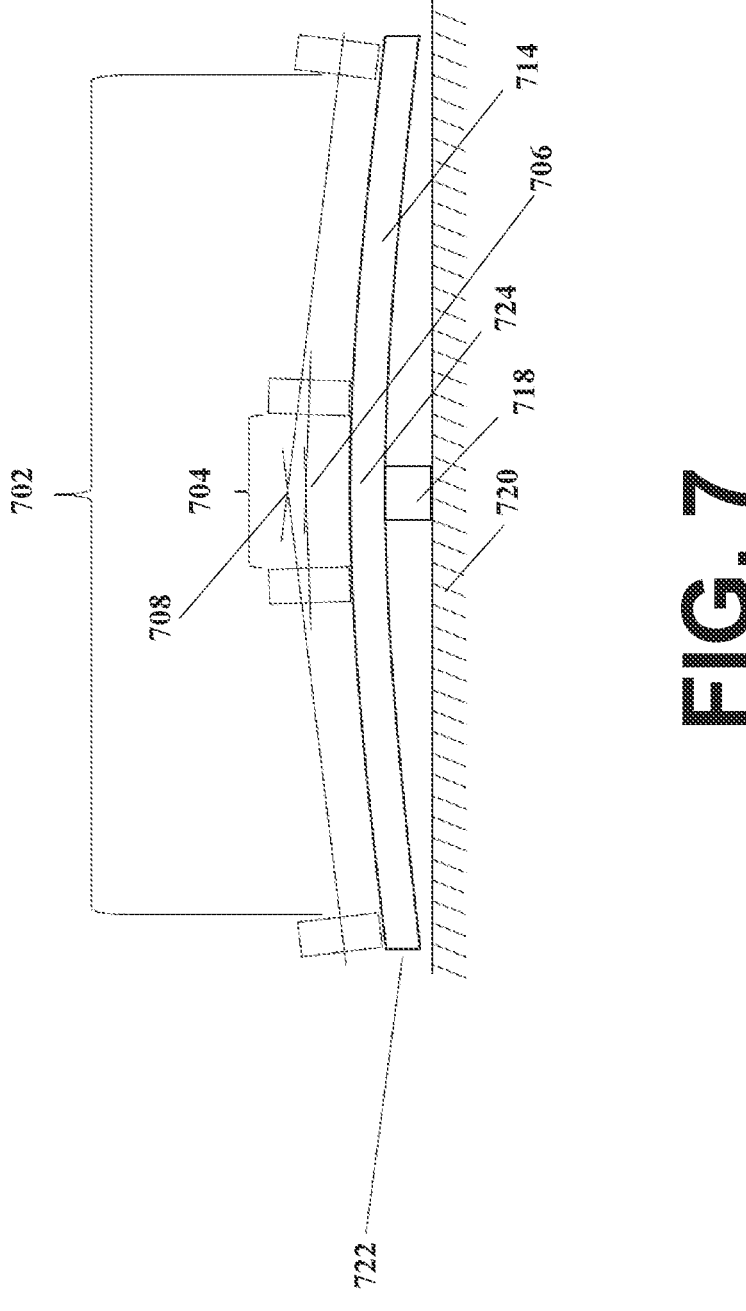
FIG. 7 shows an example optical breadboard that comprises one or more optical elements.

FIG. 7 shows an example breadboard that comprises one or more optical elements. The optical breadboard shown in FIG. 8 may comprise one or more optical elements, breadboard substrate 714, breadboard mount 718, and/or laser case 714.

The optical breadboard may be designed to bend less than a laser case at high temperatures due to uneven thermal expansion. The optical breadboard may still bend some amount. The amount the optical breadboard bends may be greater at or near one or more of the ends of the optical breadboard and may be less at or near the center. For example, breadboard substrate 714 may bend greater at breadboard end 722 than at breadboard center 724.

When optical elements are positioned closer together on optical breadboard substrate 714, such as at distance 704, the angle between them may be small as shown by optical alignment 706. When optical elements are positioned further away from each other, such as at distance 702, the angle between them may increase as shown by optical alignment 708. As distance 704 places optical elements closer together as compared to distance 706, distance 704 may improve the optical alignment and laser performance of a laser system. For example, distance 704 may provide optical alignment 706, which is improved over optical alignment 708.

Figure 8:
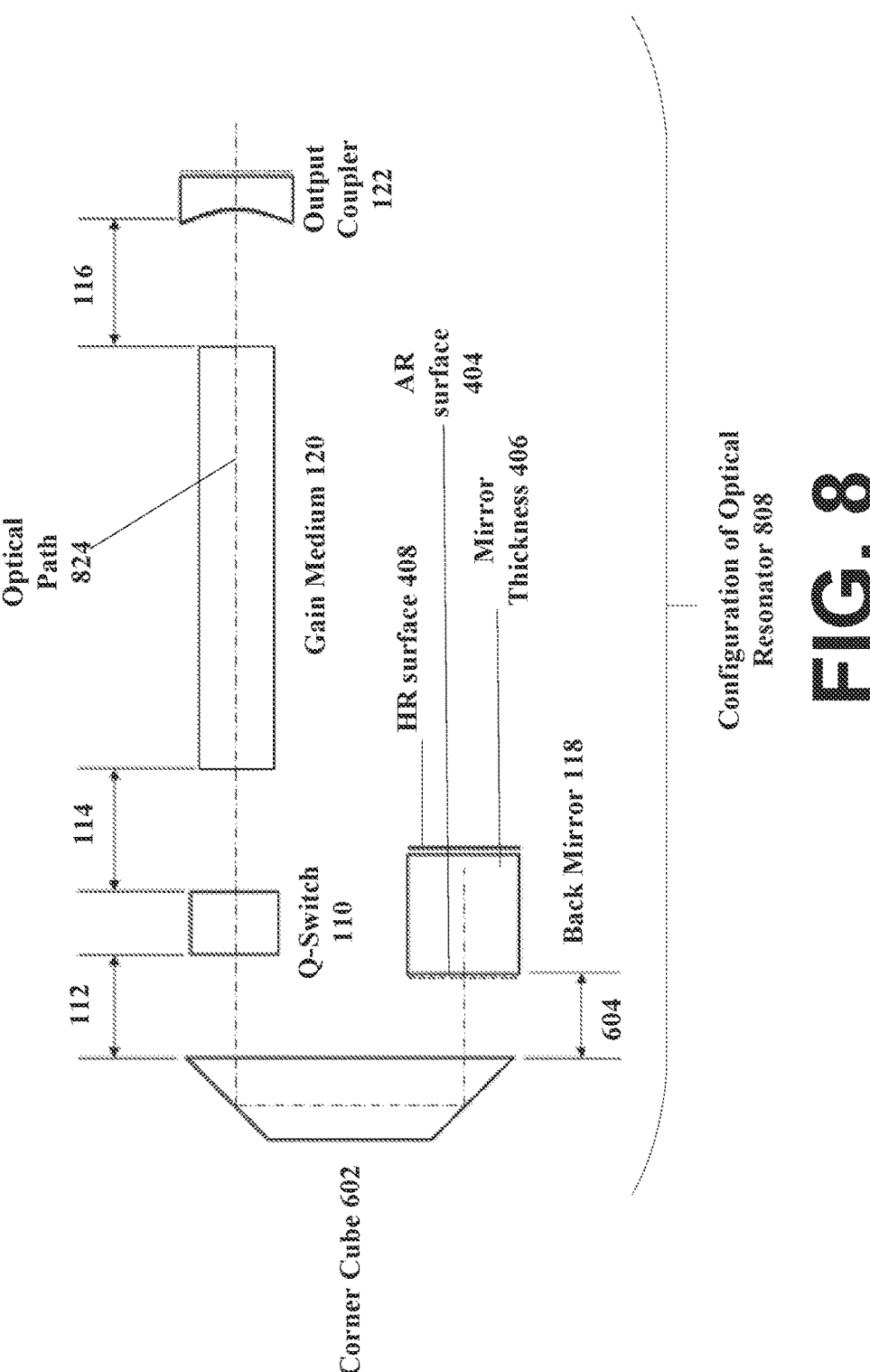
FIG. 8 shows an example laser system that comprises an optical resonator in a fourth configuration that may provide an adjustable optical path length and/or resonator cavity length.

FIG. 8 shows an example laser system that comprises an optical resonator in a fourth configuration that may provide an adjustable optical path length and/or resonator cavity length.

As show in FIG. 8, configuration of optical resonator 808 may allow back mirror 118 to be placed in a number of configurations.

In an example, back mirror 118 may be placed in a configuration where AR surface 404 is closer to corner cube 608 and/or output coupler 112 along optical path 824.

Optical path 824 may be a path that light and/or a beam, such a laser beam, may follow as it may pass through the configuration of optical resonator 808. As shown in FIG. 8 by optical path 824, light and/or a beam may follow from the HR surface 408 of back mirror 118, through mirror thickness 408, through AR surface 404, through corner cube 602, through Q-switch 110, through gain medium 120, and through optical coupler 122. In an example, configuration of optical resonator 808 may provide a fourth optical path length if the corner cube 602 and/or AR surface 404 of back mirror 118 is included in optical path 624, as light and/or a beam may pass though AR surface 404 and be reflected back by HR surface 408.

The mirror thickness 406 and/or substrate of back mirror 118 may affect the optical path length of configuration of optical resonator 808. For example, the length of optical path 824, may be affected by the thickness of back mirror 118 (e.g., mirror thickness 406) times the index of refraction of the mirror substrate.

In an example, Q-switch 110 may be placed at any location within configuration of optical resonator 808, such that Q-switch 110 may be included in optical path 824. In an example, Q-switch 110 may be disposed between output coupler 122 and gain medium 120. In an example, Q-switch 110 may be disposed between gain medium 120 and corner Q 602. In an example, Q-switch 110 may be disposed between corner cube 602 and back mirror 118.

The length of optical path 824 may be affected by the thickness of Q-switch 110 and/or substrate of 110. For example, the length of optical path 824 may be affected by the thickness of Q-switch 110 times the index of refraction of the substrate Q-switch 110.

The substrate of corner cube 602 and/or the thickness of corner cube 602 may affect the length of optical path 824. For example, the length of optical path 824, may be affected by the thickness of corner cube 602 times the index of refraction of the substrate of corner cube 602.

Corner cube 602 may be placed at any location within configuration of optical resonator 808, such that corner cube 602 may be included in optical path 824. In an example, corner cub 602 may be placed between gain medium 120 and output coupler 122. In an example, corner cube 602 may be placed between Q-switch 110 and gain medium 120. In an example, corner cube 602 may be placed between Q-Switch 110 and back mirror 118. In an example, corner cube 602 may be placed distance 604 from back mirror 118 and distance 112 from Q-switch 110.

What is claimed:

1. An optical resonator for a laser system, the optical resonator comprising:
   an output coupler;
   a gain medium that is a first distance from the output coupler along an optical path;
   a back mirror that comprises a mirror substrate having a thickness and a refractive index, a first back mirror surface that comprises a high reflective coating, and a second back mirror surface that comprises a low reflective coating, wherein a first configuration of the back mirror positions the first back mirror surface at a second distance from the gain medium along the optical path such that the first back mirror surface prevents inclusion of the mirror substrate in the optical path, and wherein a second configuration of the back mirror positions the first back mirror surface at a third distance from the gain medium along the optical path such that the second back mirror surface permits inclusion of the mirror substrate in the optical path, wherein the second distance is different from the third distance; and
   a resonator cavity, wherein the resonator cavity comprises a first optical path length when the back mirror is in the first configuration and a second optical path length when the back mirror is in the second configuration.

2. The optical resonator of claim 1, wherein the second optical path length is larger than the first optical path length by at least the thickness.

3. The optical resonator of claim 1, wherein the first optical path length comprises at least the first distance and the second distance.

4. The optical resonator of claim 3, wherein the second optical path length comprises at least the first distance, the second distance, and a fourth distance, wherein the fourth distance is between the first back mirror surface and the second back mirror surface.

5. The optical resonator of claim 1, wherein the optical resonator further comprises a Q-switch that is disposed between the gain medium and the back mirror.

6. A laser system, the laser system comprising:
   a gain medium that is a first distance from the output coupler along an optical path;
   a pump source for energizing the gain medium;
   a back mirror that comprises a mirror substrate, having a thickness and a refractive index, a first back mirror surface that comprises a high reflective coating, and a second back mirror surface that comprises a low reflective coating, and wherein a first configuration of the back mirror positions the first back mirror surface at a second distance from the gain medium along the optical path, and wherein a second configuration of the back mirror positions the first back mirror surface at a third distance from the gain medium along the optical path, wherein the second distance is different from the third distance; and
   a resonator cavity, wherein the resonator cavity comprises a first optical path length when the back mirror is in the first configuration and a second optical path length when the back mirror is in the second configuration.

7. The laser system of claim 6, wherein the laser system further comprises a Q-switch disposed between the gain medium and the back mirror.

8. The laser system of claim 6, wherein the second optical path length is larger than the first optical path length by at least the thickness.

9. The laser system of claim 6, wherein the first optical path length comprises at least the first distance and the second distance.

10. The laser system of claim 9, wherein the second optical path length comprises the first distance, the second distance, and a fourth distance, wherein the fourth distance is between the first back mirror surface and the second back mirror surface.

11. A method for configuring a laser system, the method comprising:
   positioning a back mirror in a first configuration, wherein the back mirror comprises a mirror substrate having a thickness and a refractive index, a first back mirror surface that comprises a high reflective coating, and a second back mirror surface that comprises a low reflective coating, wherein positioning the back mirror in the first configuration comprises positioning the first back mirror surface at a first distance from a gain medium along an optical path of the laser system such that the first back mirror surface prevents inclusion of the mirror substrate in the optical path; and
   positioning the back mirror in a second configuration, wherein positioning the back mirror in the second configuration comprises positioning the first back mirror surface at a second distance from the gain medium along the optical path such that the second back mirror surface permits inclusion of the mirror substrate in the optical path, wherein the first distance is different from the second distance.

12. The method of claim 11, wherein positioning the back mirror in the first configuration causes a resonator cavity of the laser system to have a first optical path length, and wherein positioning the back mirror in the second configuration causes the resonator cavity to have a second optical path length.

13. The method of claim 12, wherein the second optical path length is larger than the first optical path length by at least the thickness.

14. The method of claim 12, wherein the first optical path length comprises at least the first distance and the second distance.

15. The method of claim 12, wherein the second optical path length comprises the first distance and a third distance, wherein the third distance is between the first back mirror surface and the second back mirror surface.

* * * * *